US010680396B2

(12) United States Patent
Jung et al.

(10) Patent No.: US 10,680,396 B2
(45) Date of Patent: Jun. 9, 2020

(54) INTERFACE FOR CONNECTING PORTABLE ELECTRONIC DEVICE WITH VEHICLE

(71) Applicants: RENAULT s.a.s., Boulogne-Billancourt (FR); JITEL GLOBAL Co., Ltd., Uiwang-si (KR); 2BEONE SOLUTIONS Co., Ltd., Seoul (KR)

(72) Inventors: Chan Jung, Yongin-si (KR); Jeong Cheol Park, Suwon-si (KR); Hyung Jin Seo, Seoul (KR)

(73) Assignees: RENAULT s.a.s., Boulogne-Bilancourt (FR); JITEL GLOBAL CO., Ltd., Uiwang-si (KR); 2BEONE SOLUTIONS CO., Ltd., Seoul (KR)

( * ) Notice: Subject to any disclaimer, the term of this patent is extended or adjusted under 35 U.S.C. 154(b) by 0 days.

(21) Appl. No.: 16/200,066

(22) Filed: Nov. 26, 2018

(65) Prior Publication Data

US 2019/0173247 A1 Jun. 6, 2019

Related U.S. Application Data

(63) Continuation of application No. 15/540,385, filed as application No. PCT/KR2015/014382 on Dec. 29, 2015, now abandoned.

(30) Foreign Application Priority Data

Dec. 29, 2014 (KR) .......................... 10-2014-0191583
Nov. 26, 2015 (KR) .......................... 10-2015-0166499

(51) Int. Cl.
*H04M 1/04* (2006.01)
*H01R 31/06* (2006.01)
(Continued)

(52) U.S. Cl.
CPC ............ *H01R 31/065* (2013.01); *B60R 11/02* (2013.01); *B60R 11/0241* (2013.01);
(Continued)

(58) Field of Classification Search
CPC .............. H04M 1/6091; H04M 1/7253; F16M 11/041; F16M 11/10; B60R 11/0241; B60R 2011/0075
See application file for complete search history.

(56) References Cited

U.S. PATENT DOCUMENTS 7,970,440 B2   6/2011   Bury et al.
8,635,091 B2   1/2014   Amigo et al.
(Continued)

FOREIGN PATENT DOCUMENTS

KR   10-2010-0047027   5/2010
KR   10-2010-0119191   11/2010
KR   10-2013-0064272   6/2013

OTHER PUBLICATIONS

International Search Report dated Apr. 15, 2016 in PCT/KR2015/014382 filed Dec. 29, 2015.

*Primary Examiner* — Tuan D Nguyen
(74) *Attorney, Agent, or Firm* — Oblon, McClelland, Maier & Neustadt, L.L.P.

(57) ABSTRACT

An interface device for connecting a portable electronic device to a vehicle includes a holding module having a slot into which a portable electronic device with a display is inserted and a front opening exposing the display of the inserted portable electronic device, and an adaptor module coupled to a rear part of the holding module and connecting the portable electronic device to a vehicle. The holding module is disposed on a center fascia of the vehicle, and the adaptor module is disposed in the center fascia.

13 Claims, 5 Drawing Sheets

(51) Int. Cl.
  *H04M 1/725* (2006.01)
  *H04N 5/225* (2006.01)
  *H04N 5/64* (2006.01)
  *F16M 13/00* (2006.01)
  *B60R 11/02* (2006.01)
  *B60R 16/03* (2006.01)
  *H01R 12/70* (2011.01)
  *F16M 11/04* (2006.01)
  *F16M 11/10* (2006.01)
  *H04M 1/60* (2006.01)
  *B60R 11/00* (2006.01)
  *H04N 7/01* (2006.01)

(52) U.S. Cl.
  CPC ........... *B60R 16/03* (2013.01); *F16M 11/041* (2013.01); *F16M 11/10* (2013.01); *F16M 13/00* (2013.01); *H01R 12/7076* (2013.01); *H04M 1/04* (2013.01); *H04M 1/6091* (2013.01); *H04M 1/7253* (2013.01); *H04M 1/72527* (2013.01); *H04N 5/2251* (2013.01); *H04N 5/64* (2013.01); *B60R 2011/0075* (2013.01); *B60R 2011/0294* (2013.01); *H04N 7/01* (2013.01)

(56) References Cited

U.S. PATENT DOCUMENTS

| | | | |
|---|---|---|---|
| 9,070,168 B2 | 6/2015 | Amigo et al. | |
| 2009/0048007 A1* | 2/2009 | Bury | B60R 11/0241 455/575.9 |
| 2011/0153367 A1* | 6/2011 | Amigo | G06Q 40/08 705/4 |
| 2012/0088446 A1* | 4/2012 | Fyke | H04K 3/415 455/1 |
| 2014/0114696 A1* | 4/2014 | Amigo | G06Q 40/08 705/4 |
| 2015/0269791 A1 | 9/2015 | Amigo et al. | |

* cited by examiner

INTERFACE FOR CONNECTING PORTABLE ELECTRONIC DEVICE WITH VEHICLE

CROSS REFERENCE TO RELATED APPLICATION

This application is a continuation of U.S. application Ser. No. 15/540,385, filed Jun. 28, 2017, which claims priority to Korean Patent Application Nos. 10-2015-0166499, filed Nov. 26, 2018 and 10-2014-0191583, filed Dec. 29, 2014; the entire contents of each of which are incorporated herein by reference.

TECHNICAL FIELD

The present invention relates to an interface device for connecting a portable electronic device to a vehicle, and more particularly, to an interface device for detachably connecting a portable electronic device such as a tablet personal computer (PC), a smartphone, or the like to a vehicle.

BACKGROUND ART

Recently, telematics terminals for providing various multimedia services, vehicle diagnosis information, or the like to drivers have been widely spread. For example, the telematics terminals may provide, to drivers, various functions such as navigation, burglar alarm, emergency rescue signaling (e.g., SOS), remote diagnosis, consumables management, handsfree portable communication, living information provision, Internet access, and the like.

Portable electronic devices such as tablet PCs, smartphones, and the like may provide functions similar to the functions of the telematics terminals. In general, a driver may dispose such a portable electronic device on a dashboard of a vehicle using a vehicle mount, and may use a navigation function or may conveniently use a handsfree function through a microphone and speakers of the vehicle.

However, in the case of mounting a portable electronic device in a vehicle using a vehicle mount, a locked state of the mount may be released or the portable electronic device may be separated from the mount while the vehicle is driven. Furthermore, it may be difficult to check driving information or diagnosis information of the vehicle using the portable electronic device. In particular, the driver may be interfered with while driving the vehicle if a navigation screen of the portable electronic device is switched to another application screen by a notification function of the portable electronic device. Moreover, the driver may cause a traffic accident while manipulating the portable electronic device to check a notification message.

DISCLOSURE OF THE INVENTION

Technical Problem

Some embodiments of the present invention may provide an interface device for connecting a portable electronic device to a vehicle so that the portable electronic device is safely used in the vehicle while the vehicle is driven.

Technical Solution

According to some embodiments of the present invention, an interface device for connecting a portable electronic device to a vehicle may include a holding module having a slot into which a portable electronic device with a display is inserted and a front opening exposing the display of the inserted portable electronic device, and an adaptor module coupled to a rear part of the holding module and connecting the portable electronic device to a vehicle. Particularly, the holding module may be disposed on a center fascia of the vehicle, and the adaptor module may be disposed in the center fascia.

According to some embodiments of the present invention, the slot may extend horizontally through a side portion of the holding module, and a communication terminal for connecting the portable electronic device to the adaptor module may be provided in the slot.

According to some embodiments of the present invention, the interface device may further include an eject unit for ejecting the portable electronic device from the slot.

According to some embodiments of the present invention, the eject unit may include an eject member configured to be movable in a direction in which the portable electronic device is inserted into the slot or ejected from the slot, the eject member tightly contacting one side surface of the electronic device inserted into the slot, and an elastic member for applying elastic restoring force to the eject member in the direction in which the portable electronic device is ejected from the slot.

According to some embodiments of the present invention, the eject unit may further include a locking member for fixing the eject member so that the portable electronic device is held in the slot.

According to some embodiments of the present invention, the eject unit may further include a release member for releasing a state in which the eject member is fixed by the locking member.

According to some embodiments of the present invention, the holding module may include a front plate having the slot and the front opening, a rear plate coupled to the adaptor module, and first and second mid-plates arranged between the front plate and the rear plate, wherein the eject unit may be disposed on the second mid-plate, and the first mid-plate may be provided with a guide slot for guiding the eject member.

According to some embodiments of the present invention, the interface device may further include a latch member for preventing the portable electronic device inserted into the slot from escaping therefrom.

According to some embodiments of the present invention, when the portable electronic device is connected to the adaptor module, a vehicle mode of the portable electronic device may be performed.

According to embodiments of the present invention, a navigation program may be run as a background program in the vehicle mode.

According to embodiments of the present invention, a notification message of the portable electronic device may be blocked while the vehicle mode is performed.

According to embodiments of the present invention, a home button of the portable electronic device and an indicator region disposed at an edge portion of the display may be covered by a front part of the holding module.

Advantageous Effects

According to embodiments of the present invention as described above, an interface device may include a holding module for receiving a portable electronic device and an adaptor module for connecting the portable electronic device to a vehicle. The holding module may have a slot to which the portable electronic device is inserted and a front opening through which the inserted portable electronic device is exposed, and a home button disposed at an edge portion of the portable electronic device and an indicator region disposed at an edge portion of the display may be covered by a front part of the holding module.

In the case where the portable electronic device is connected to the adaptor module, a vehicle mode of the portable electronic device may be performed, and, while the vehicle mode is performed, a notification message of the portable electronic device may be blocked. Therefore, a traffic accident that may occur when a driver operates a normal mode of the portable electronic device or checks the notification message may be prevented.

Furthermore, since the portable electronic device may be used as a telematics terminal of the vehicle, the cost of manufacturing the vehicle may be remarkably reduced. Moreover, since the portable electronic device may be separated from the vehicle so as to be used for other purposes when the vehicle is not driven, the usefulness of the portable electronic device may be remarkably improved.

MODE FOR CARRYING OUT THE INVENTION

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

It will be understood that when one element is referred to as being disposed on or connected to another element, it can be directly disposed on or connected to the other element, or other elements may be interposed therebetween. It will be further understood that when one element is referred to as being directly disposed on or connected to another element, there is no intervening element therebetween. The terms "first", "second", "third", and the like may be used herein to describe various items such as elements, compositions, regions, layers and/or parts, but the items are not limited by the terms.

The terminology used herein is used only for describing specific embodiments and is not intended to limit the present invention. All terms used herein, including technical or scientific terms, have the same meanings as understood by those skilled in the art unless otherwise specified. The terms such as those defined in commonly used dictionaries should be interpreted as having a meaning that is consistent with their meaning in the context of the relevant art and will not be interpreted in an idealized or overly formal sense unless expressly so defined herein.

Embodiments of the present invention are described with reference to schematic diagrams of ideal embodiments of the present invention. Therefore, modifications from the shapes of the diagrams, such as modifications to manufacturing methods and/or allowable errors, would be sufficiently predicted. Therefore, embodiments of the present invention are not limited to specific shapes of regions illustrated in the diagrams, but cover deviations from the shapes. The elements illustrated in the drawings are merely schematic and are not intended to describe accurate shapes of the elements or limit the scope of the present invention.

Figure 1:
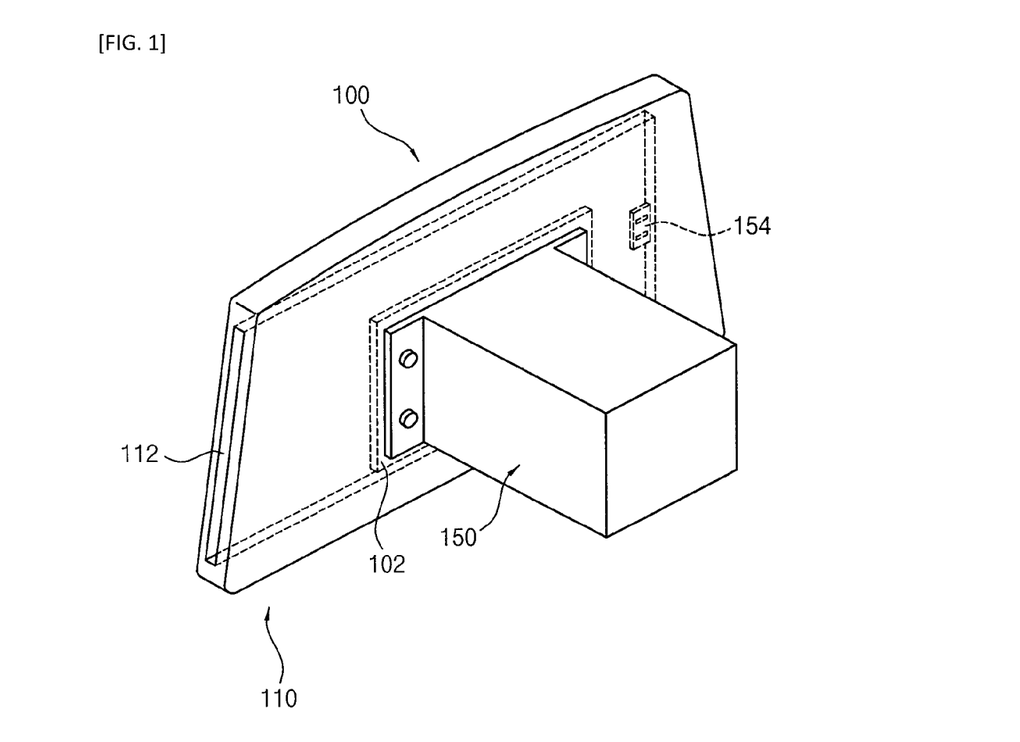
FIG. 1 is a schematic diagram illustrating an interface device for connecting a portable electronic device to a vehicle according to an embodiment of the present invention.
Figure 2:
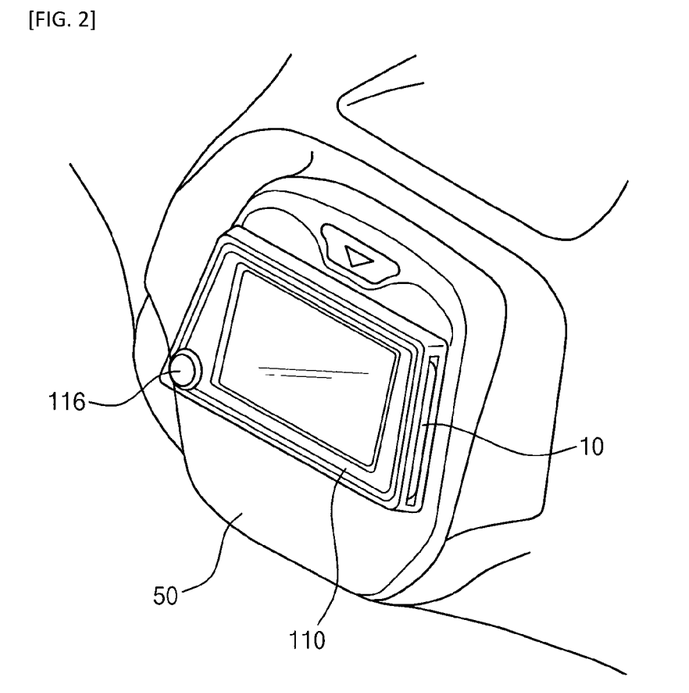
FIG. 2 is a schematic perspective view illustrating a state in which the interface device of FIG. 1 is mounted in a vehicle.
Figure 3:
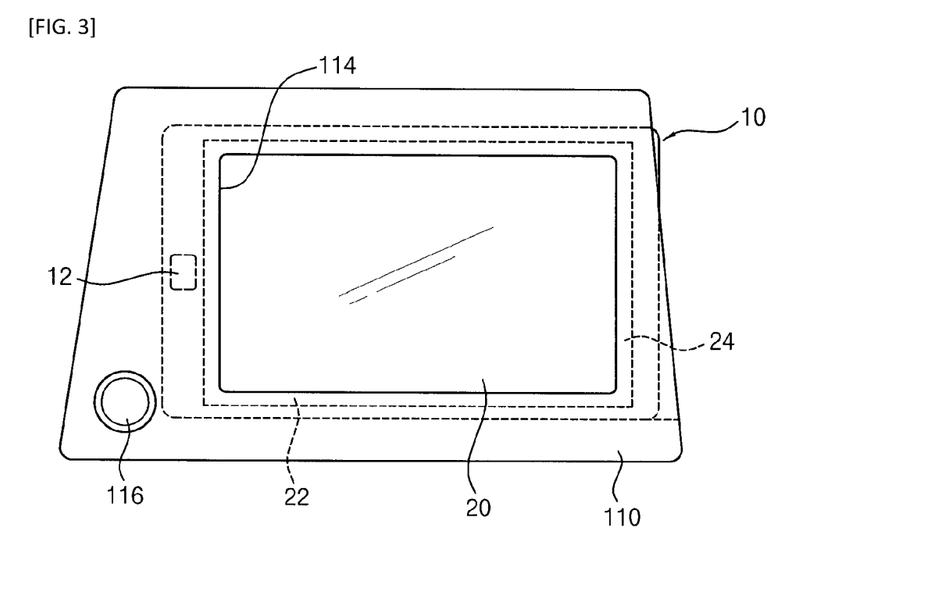
FIG. 3 is a front view of the interface device of FIG. 1.

FIG. 1 is a schematic diagram illustrating an interface device for connecting a portable electronic device to a vehicle according to an embodiment of the present invention, FIG. 2 is a schematic perspective view illustrating a state in which the interface device of FIG. 1 is mounted in a vehicle, and FIG. 3 is a front view of the interface device of FIG. 1.

Referring to FIGS. 1 to 3, an interface device 100 according to an embodiment of the present invention may be used to connect a portable electronic device 10 such as a tablet PC, a smartphone, or the like to a vehicle, wherein the portable electronic device 10 connected to the vehicle through the interface device 100 may be used as a telematics terminal.

For example, a vehicle mode which is different from a normal use mode may be installed in the portable electronic device 10. The vehicle mode may include functions such as navigation, handsfree portable communication, multimedia, broadcast reception, Internet access, etc. Furthermore, when the portable electronic device 10 is connected to the vehicle through the interface device 10, a driver may check driving information, diagnosis information, or the like of the vehicle using the portable electronic device 10.

According to an embodiment of the present invention, as illustrated in FIG. 1, the interface device 100 may include a holding module 110 for receiving the portable electronic device 10 and an adaptor module 150 for connecting the portable electronic device 10 to the vehicle. The portable electronic device 10 may include a display 20, which may include a touch panel (not shown) for receiving a user input.

The holding module 110 may be generally shaped like a rectangular plate and may be disposed on a dashboard of the vehicle. In particular, as illustrated in FIG. 2, the holding module 110 may be disposed on a center fascia 50 positioned at a center of the dash board. The center fascia 50 may have an opening into which the adaptor module 150 is inserted. The adaptor module 150 may be coupled to a rear part of the holding module 110, and may be disposed in the center fascia 50.

Referring to FIGS. 1 and 3, the holding module 110 may have a slot 112 into which the portable electronic device 10 is inserted and a front opening 114 through which the inserted portable electronic device 10 is exposed. The slot 112 may be horizontally formed through a side portion of the holding module 110, and an edge portion 22 of the display 20 may be covered by a front part of the holding module 110.

A communication terminal 154 for a connection between the portable electronic device 10 and the adaptor module 150 may be provided in the slot 112, and, when the portable electronic device 10 is sufficiently inserted into the slot 112, the communication terminal 154 may be connected to an external connection terminal of the portable electronic device 10.

In particular, in the case where the portable electronic device 10 is connected to the adaptor module 150 as described above, the vehicle mode of the portable electronic device 10 may be automatically performed. In detail, after the portable electronic device 10 is connected to the adaptor module 150, the vehicle mode may be automatically performed by a control signal provided from the adaptor module 150, and a battery of the portable electronic device 10 may be charged by the adaptor module 150.

According to an embodiment of the present invention, while the vehicle mode is performed, a navigation program may be run as a background program, and a notification message of the portable electronic device 10 may be blocked. In particular, notification messages from various programs run in a normal mode of the portable electronic device 10 may be blocked, so that the driver may be prevented from manipulating the portable electronic device 10 to check the messages.

Furthermore, as illustrated in FIG. 3, a home button 12 of the portable electronic device 10 and an indicator region 24 disposed at the edge portion 22 of the display 20 may be covered by the front part of the holding module 110. Therefore, the driver is not allowed to touch the indicator region 24 while driving the vehicle, and thus the portable electronic device 10 may be prevented from being mistakenly switched from the vehicle mode to the normal mode. As a result, a traffic accident that may be caused by driver's unnecessary manipulation of the portable electronic device 10 while driving may be prevented.

According to an embodiment of the present invention, the holding module 110 may include a power switch 116 for adjusting volume of the portable electronic device 10, turning on/off the display 20, and turning on/off the portable electronic device 10. For example, the power switch 116 may be a push/rotary button type, and the volume of the portable electronic device 10 may be adjusted by rotating the power switch 116. In particular, in the case where the volume of the portable electronic device 10 is adjusted using the power switch 116, the volume of speakers 64 of the vehicle connected to the portable electronic device 10 may be adjusted. Furthermore, by short pressing or long pressing the power switch 116, turning on/off of the display 20 or turning on/off or rebooting of the portable electronic device 10 may be performed.

Figure 4:
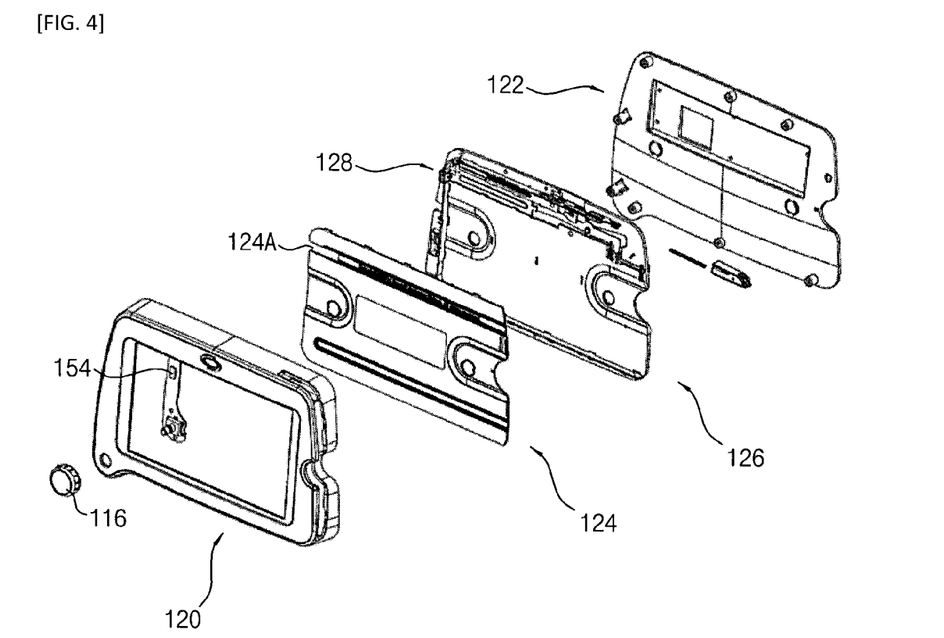
FIG. 4 is an exploded perspective view illustrating the holding module of FIG. 1.
Figure 5:
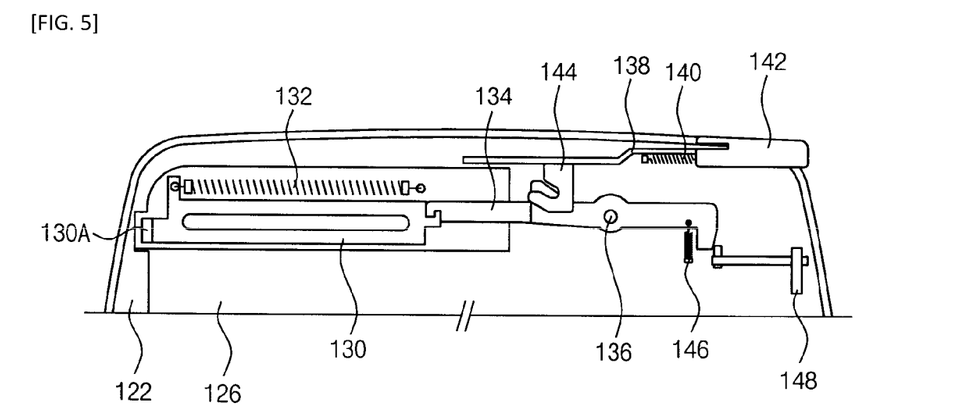
FIGS. 5 and 6 are schematic diagrams illustrating operation of the eject unit of FIG. 4.
Figure 6:
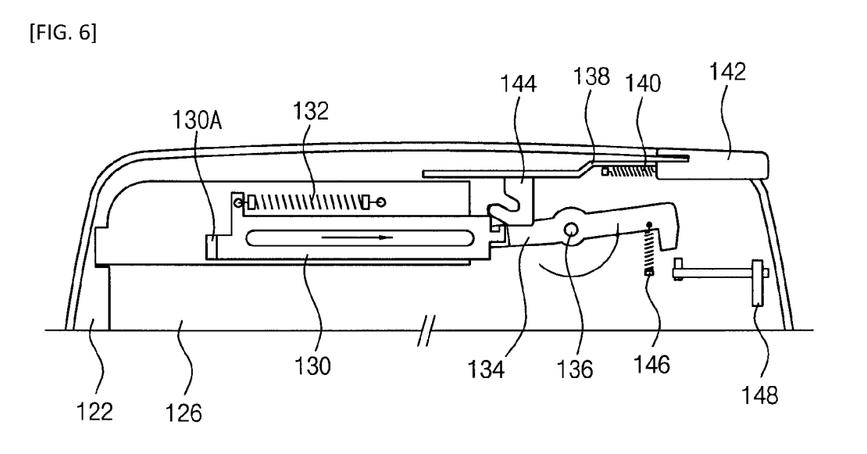

FIG. 4 is an exploded perspective view illustrating the holding module of FIG. 1, and FIGS. 5 and 6 are schematic diagrams illustrating operation of the eject unit of FIG. 4.

Referring to FIGS. 4 to 6, the holding module may include a front plate 120 in which the slot 112 and the front opening 114 is formed, a rear plate 122 coupled to the adaptor module 150, and first and second mid-plates 124 and 126 arranged between the front plate 120 and the rear plate 122.

In particular, an eject unit 128 for ejecting the portable electronic device 10 from the slot 112 may be disposed between the first and second mid-plates 124 and 126.

The eject unit 128 may include an eject member 130 configured to be movable in a direction in which the portable electronic device 10 is inserted into the slot 112 and ejected from the slot 112, i.e., in a horizontal direction, and an elastic member 132 for applying elastic restoring force to the eject member 130. For example, the eject member 130 may tightly contact one side surface of the portable electronic device 10 inserted into the slot 112, and the elastic member 132 such as a coil spring may apply elastic reinforcing force to the eject member 130 in the direction in which the portable electronic device 10 is ejected. The eject unit 128 may be mounted on the second mid-plate 126, and the first mid-plate 124 may be provided with a guide slot 124A for guiding the eject member 130. Here, a front surface of the first mid-plate 124 may serve as a rear surface of the slot 112 into which the portable electronic device 10 is inserted. In particular, the eject member 130 may have an end portion 130A protruding towards a front surface of the holding module 110 so as to tightly contact one side surface of the portable electronic device 10, wherein the protruding end portion 130a may be moved along the guide slot 124A of the first mid-plate 124.

Referring to FIGS. 5 and 6, the elastic member 132 may be connected between the eject member 130 and the second mid-plate 126. The elastic member 132 may extend when the eject member 130 is moved towards the inside of the slot 112 due to insertion of the portable electronic device 10, so that elastic restoring force may be applied to the eject member 130.

Furthermore, the eject unit 130 may include a locking member 134 for fixing the eject member 130 so as to hold the portable electronic device 10 in the slot 112. For example, as illustrated in FIGS. 5 and 6, the locking member 134 may be shaped like a bar extending in an insertion/ejection direction of the portable electronic device 10, and may be rotatably mounted to the second mid-plate 126.

In particular, the locking member 134 may be mounted to a rotating shaft 136 installed in a front-rear direction of the interface device 100, and an operation of locking or releasing the eject member 130 may be performed by rotation of the locking member 134.

In addition, the eject unit 128 may include a release member 138 for releasing a state in which the eject member 130 is fixed by the locking member 134. The release member 138 may be disposed over the locking member 134 and may be configured to be movable horizontally. For example, the release member 138 may be shaped like a bar extending horizontally, and may be elastically supported by a second elastic member 140 such as a coil spring. In detail, a push button 142 may be coupled to one side end portion of the release member 138 so that the driver may operate the release member 138 with ease, and the second elastic member 140 may apply elastic restoring force to the release member 138 and the push button 142 so that the push button 142 may protrude out of the holding module 110.

A wedge member 144 for applying downward force to the locking member 134 may be provided under the release member 138, and, although not illustrated in the drawings in detail, the locking member 134 may have a protrusion to be tightly contacted by the wedge member 144. That is, in the case where the release member 138 is moved towards the inside of the holding module 110 by the driver, the locking member 134 may be rotated by the wedge member 144, thereby releasing a locked state of the eject member 130.

In particular, the locking member 134 may be held in a horizontal position by a third elastic member 146 such as a coil spring, and one side end portion of the locking member 134 held in a horizontal position may support the eject member 130 moved towards the inside the slot 112. As illustrated in FIG. 6, the locking member 134 is rotated counterclockwise by the wedge member 144 of the release member 138 so that the locked state of the ejected member 130 is released. Then, the eject member 130 may be moved towards the outside of the slot 112 by the elastic member 132, thereby ejecting the portable electronic device 10 from the slot 112. On the contrary, in the case where the portable electronic device 10 is inserted into the slot 112, the locking member 134 may be rotated in an opposite direction, for example, clockwise, by the third elastic member 146, so that the eject member 130 may be fixed by one side end portion of the locking member 134.

Meanwhile, according to an embodiment of the present invention, the holding module 110 may include a latch member 148 for preventing the portable electronic device 10 inserted into the slot 112 from escaping therefrom. Although not illustrated in the drawings in detail, the latch member 148 may be elastically supported to the second mid-plate 126, and may protrude towards the front of the holding module 110 so as to prevent the portable electronic device 10 from being escaped from the slot 112 after the portable electronic device 10 is inserted thereinto sufficiently. Here, although not illustrated in the drawings in detail, the first mid-plate 124 may be provided with a second opening, and the latch member 148 may be disposed in the second opening.

Referring back to FIG. 1, the adaptor module 150 may include a case generally shaped like a square box, and may be coupled to the rear part of the holding module 110 by fastening members such as bolts or the like. Although not illustrated in the drawings in detail, connection terminals (not shown) may be arranged at the rear part or side part of the adaptor module 150 for a connection to the vehicle, more specifically, on-board diagnostics (OBD) 60, an electronic control unit (ECU) 62, the speakers 64, a vehicle microphone 66, a radio antenna 68, an air conditioning system 70, a rear camera 72, a steering wheel volume switch 74, a vehicle power supply 76, etc. of the vehicle, and a thermal insulating member 102 may be interposed between the holding module 110 and the adaptor module 150.

Figure 7:
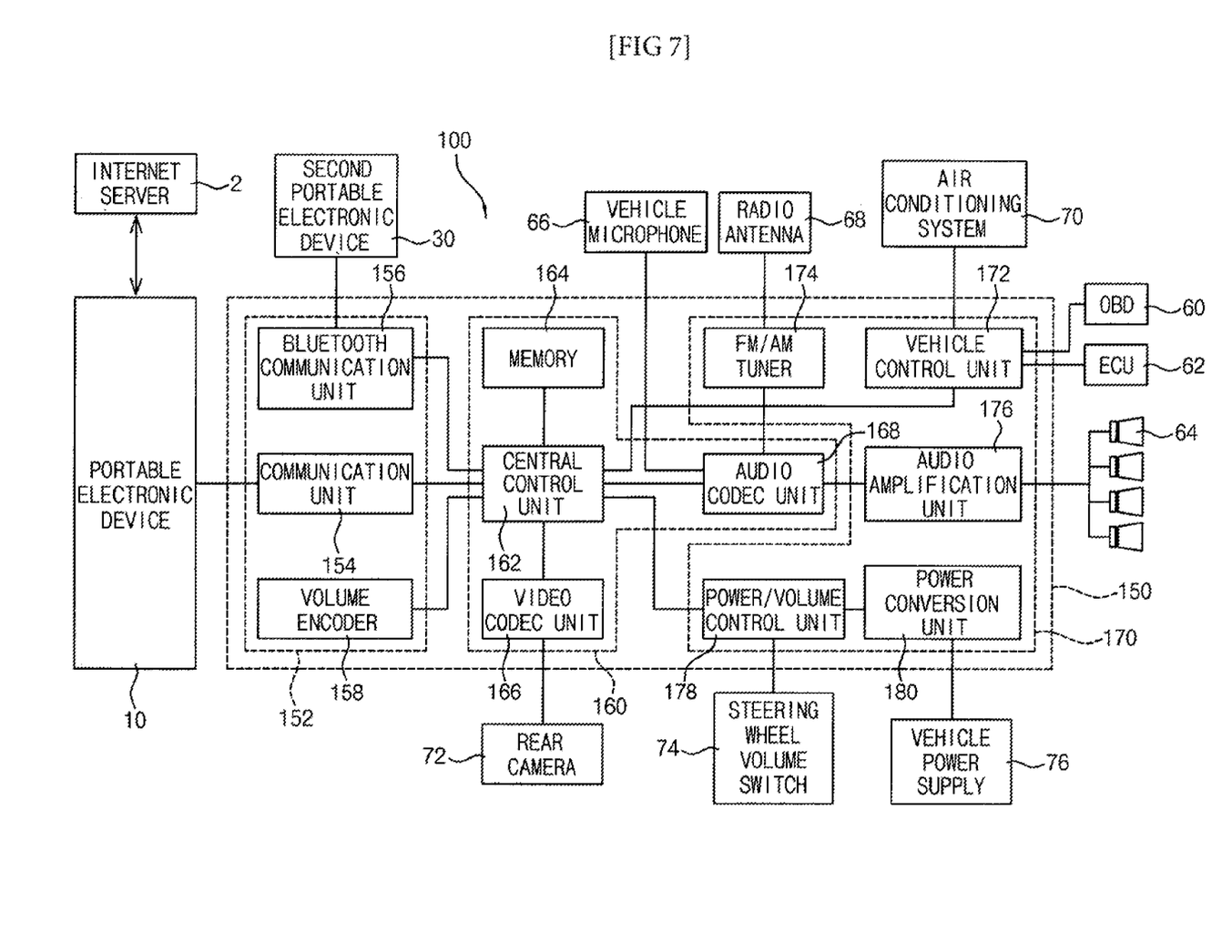
FIG. 7 is a block diagram illustrating the adaptor module of FIG. 1.

FIG. 7 is a block diagram illustrating the adaptor module of FIG. 1.

Referring to FIG. 7, the portable electronic device 10 may be connected to an Internet server 2 through wireless communications, and may download navigation data, Internet broadcast data, music data, etc. from the Internet server 2.

The adaptor module 150 may include a front board 152 for communication with the portable electronic device 10, a core board 160 for controlling a system and processing data, and a main board 170 for processing control signals and power of the vehicle.

The front board 152 may include a communication terminal 154 for a connection to the portable electronic device 10, a Bluetooth communication unit 156, and a volume encoder 158, and the core board 160 may include a central control unit 162, a memory device 164, a video codec unit 166, and an audio codec unit 168. Furthermore, the main board 170 may include a vehicle control unit 172, an FM/AM tuner 174, an audio amplification unit 176, a power/volume control unit 178, and a power conversion unit 180.

The communication terminal 154 may be connected to an external connection terminal of the portable electronic device 10, and the Bluetooth communication unit 156 may be used to communicate with a second portable electronic device 30. For example, the communication terminal 154 may be used to transfer control signals or data between the portable electronic device 10 and the adaptor module 150 and charge the portable electronic device 10. In the case where a tablet PC is connected to the adaptor module 150 through the communication terminal 154, the Bluetooth communication unit 156 may be used to connect a smartphone to the adaptor module 150. In particular, the Bluetooth communication unit 156 may be used to use a handsfree portable communication function based on the smartphone and the vehicle microphone 66 or play, via the tablet PC, multimedia data such as a video or music stored in the smartphone.

The volume encoder 158 may be connected to the power switch 116 of the holding module 110, and may be used to adjust the volume of the portable electronic device 10 and the speakers 64 of the vehicle. Furthermore, an on/off signal for the display 20 or an on/off signal for the portable electronic device 10 received via the power switch 116 may be transferred to the central control unit.

The central control unit 162 may be used to process commands or data or transmit/receive data, and the memory device 164 may be used to store data and software related to operation of the adaptor module 150.

The video codec unit 166 may convert an analog image signal obtained by the rear camera 72 into a digital image signal so that it can be played through the display 20, and may transmit the digital image signal to the central control unit 162. In particular, the central control unit 162 may transmit, to the portable electronic device 10, the converted image signal and a control signal for executing a video playback program of the portable electronic device 10 when the vehicle is reversed, so that the converted image signal may be played through the display 20.

Although not illustrated in the drawings, a black box device (not shown) of the vehicle may be connected to the portable electronic device 10 through the adaptor module 150, and an image signal obtained by the black box device may be played through the display 20.

The audio codec unit 168 may receive sound data from the central control unit 162, the vehicle microphone 66, the FM/AM tuner 174, or an AUX (not shown), may convert the sound data into a sound signal playable by the speakers 64 of the vehicle, and may transmit the sound signal to the audio amplification unit 176. The audio amplification unit 176 may be connected to the speakers 64 of the vehicle, and may amplify the sound signal to transmit the sound signal to the speakers 64 of the vehicle.

The FM/AM tuner 174 may be connected to the radio antenna 68, and may receive a radio broadcast signal to transfer the radio broadcast signal to the audio codec unit 168. Furthermore, the portable electronic device 10 may download radio broadcast data from the Internet server 2, and may play the radio broadcast data through the speakers 64 of the vehicle.

The vehicle control unit 172 may be connected to the OBD 60 and/or the ECU 62 of the vehicle, and may be used to output diagnosis information and driving information of the vehicle through the display 20. Furthermore, the vehicle control unit 172 may be used to control the air conditioning system 70 including an air conditioner and a heater. In particular, the vehicle mode of the portable electronic device 10 may include an application program for displaying the diagnosis information and the driving information and an application program for controlling the air conditioning system 70.

The power/volume control unit 178 may be connected to the steering wheel volume switch 74 of the vehicle, and may be used to control the volume of the speakers 64 of the vehicle. The power/volume control unit 178 may be connected to the portable electronic device 10 through the central control unit 162, and the volume of the speakers 64 may be displayed by the display 20.

Furthermore, the power/volume control unit 178 may be connected to the power conversion unit 180 to charge the battery of the portable electronic device 10. The power conversion unit 180 may be connected to the vehicle power supply 76, and may convert a power supply voltage of the vehicle into a charging voltage of the portable electronic device 10 to provide power to the portable electronic device 10.

As described above, according to some embodiments of the present invention, the interface device 100 may include the holding module 110 for receiving the portable electronic device 10 and the adaptor module 150 for connecting the portable electronic device 10 to the vehicle. The holding module 110 may have the slot 112 to which the portable electronic device 10 is inserted and the front opening 114 through which the inserted portable electronic device 10 is exposed, and the home button 12 disposed at an edge portion of the portable electronic device 10 and the indicator region 24 disposed at the edge portion 22 of the display 20 may be covered by the front part of the holding module 110.

In the case where the portable electronic device 10 is connected to the adaptor module 150, the vehicle mode of the portable electronic device 10 may be performed, and, while the vehicle mode is performed, a notification message of the portable electronic device 10 may be blocked. Therefore, a traffic accident that may occur when the driver operates the normal mode of the portable electronic device 10 or checks the notification message may be prevented.

Furthermore, since the portable electronic device 10 may be used as a telematics terminal of the vehicle, the cost of manufacturing the vehicle may be remarkably reduced. Moreover, since the portable electronic device 10 may be separated from the vehicle so as to be used for other purposes when the vehicle is not driven, the usefulness of the portable electronic device 10 may be remarkably improved.

Although the present invention has been described with reference to preferred embodiments of the present invention, it will be readily understood by those skilled in the art that various modifications and changes can be made thereto without departing from the spirit and scope of the present invention defined by the appended claims.

The invention claimed is:

1. An interface device for connecting a portable electronic device to a vehicle, the interface device comprising:
    a holding module having a slot into which a portable electronic device with a display is inserted and a front opening exposing the display of the inserted portable electronic device;
    an adaptor module coupled to a rear part of the holding module and connecting the portable electronic device to a vehicle; and
    an eject unit for ejecting the portable electronic device from the slot, the eject unit comprising:
    wherein when the portable electronic device is connected to the adapter module, a vehicle mode of the portable electronic device is performed,
    wherein a home button of portable electronic device and an indicator region disposed at an edge portion of the display are covered by the front face of the holding module so as to prevent a driver from switching an operation mode of the portable electronic device from the vehicle mode to a normal mode while driving the vehicle, and
    wherein the holding module is disposed on a center fascia of the vehicle, and the adaptor module is disposed in the center fascia.

2. The interface device of claim 1, wherein the slot extends horizontally through a side portion of the holding module, and a communication terminal for connecting the portable electronic device to the adaptor module is provided in the slot.

3. The interface device of claim 1, wherein the eject unit comprises:
    an eject member configured to be movable in a direction in which the portable electronic device is inserted into the slot and ejected from the slot, the eject member tightly contacting one side surface of the electronic device inserted into the slot;
    a first elastic member for applying elastic restoring force to the eject member in the direction in which the portable electronic device is ejected from the slot; and
    a release member to release the eject member to eject the portable electronic device from the slot, the release member being biased by a second elastic member in the direction in which the portable electronic device is ejected.

4. The interface device of claim 3, wherein the eject unit further comprises a locking member for fixing the eject member so that the portable electronic device is held in the slot.

5. The interface device of claim 4, further comprising:
    a wedge member provided under the release member and configured to apply a downward force to the locking member when the release member is moved in the horizontal direction.

6. The interface device of claim 5, wherein the wedge member is configured to rotate the locking member via the downward force to release a locked state of the eject member and move the eject member in the direction in which the portable electronic device is ejected from the slot.

7. The interface device of claim 4, further comprising:
    a third elastic member that is oriented vertically to hold the locking member in a horizontal position.

8. The interface device of claim 7, wherein third elastic member is a coil spring.

9. The interface device of claim 3, wherein the holding module comprises:
    a front plate having the slot and the front opening;
    a rear plate coupled to the adaptor module; and
    first and second mid-plates arranged between the front plate and the rear plate,
    wherein the eject unit is disposed on the second mid-plate, and the first mid-plate is provided with a guide slot for guiding the eject member.

10. The interface device of claim 3, wherein the first elastic member is a coil spring and the second elastic member is a coil spring.

11. The interface device of claim 1, further comprising a latch member for preventing the portable electronic device inserted into the slot from escaping therefrom.

12. The interface device of claim 1, wherein a navigation program is run as a background program in the vehicle mode.

13. The interface device of claim 1, wherein a notification message of the portable electronic device is blocked while the vehicle mode is performed.

* * * * *

UNITED STATES PATENT AND TRADEMARK OFFICE
CERTIFICATE OF CORRECTION

PATENT NO. : 10,680,396 B2  
APPLICATION NO. : 16/200066  
DATED : June 9, 2020  
INVENTOR(S) : Chan Jung et al.

Page 1 of 1

It is certified that error appears in the above-identified patent and that said Letters Patent is hereby corrected as shown below:

On the Title Page

Item (73), the First Assignee's city of residence is incorrect. Item (73) should read:
-- (73) Assignees: RENAULT s.a.s., Boulogne-Billancourt (FR); JITEL GLOBAL Co., Ltd., Uiwang-si (KR); 2BEONE SOLUTIONS Co., Ltd., Seoul (KR) --

Signed and Sealed this  
Second Day of February, 2021

Drew Hirshfeld  
*Performing the Functions and Duties of the*  
*Under Secretary of Commerce for Intellectual Property and*  
*Director of the United States Patent and Trademark Office*